Inventor:
Joseph F. Joy.

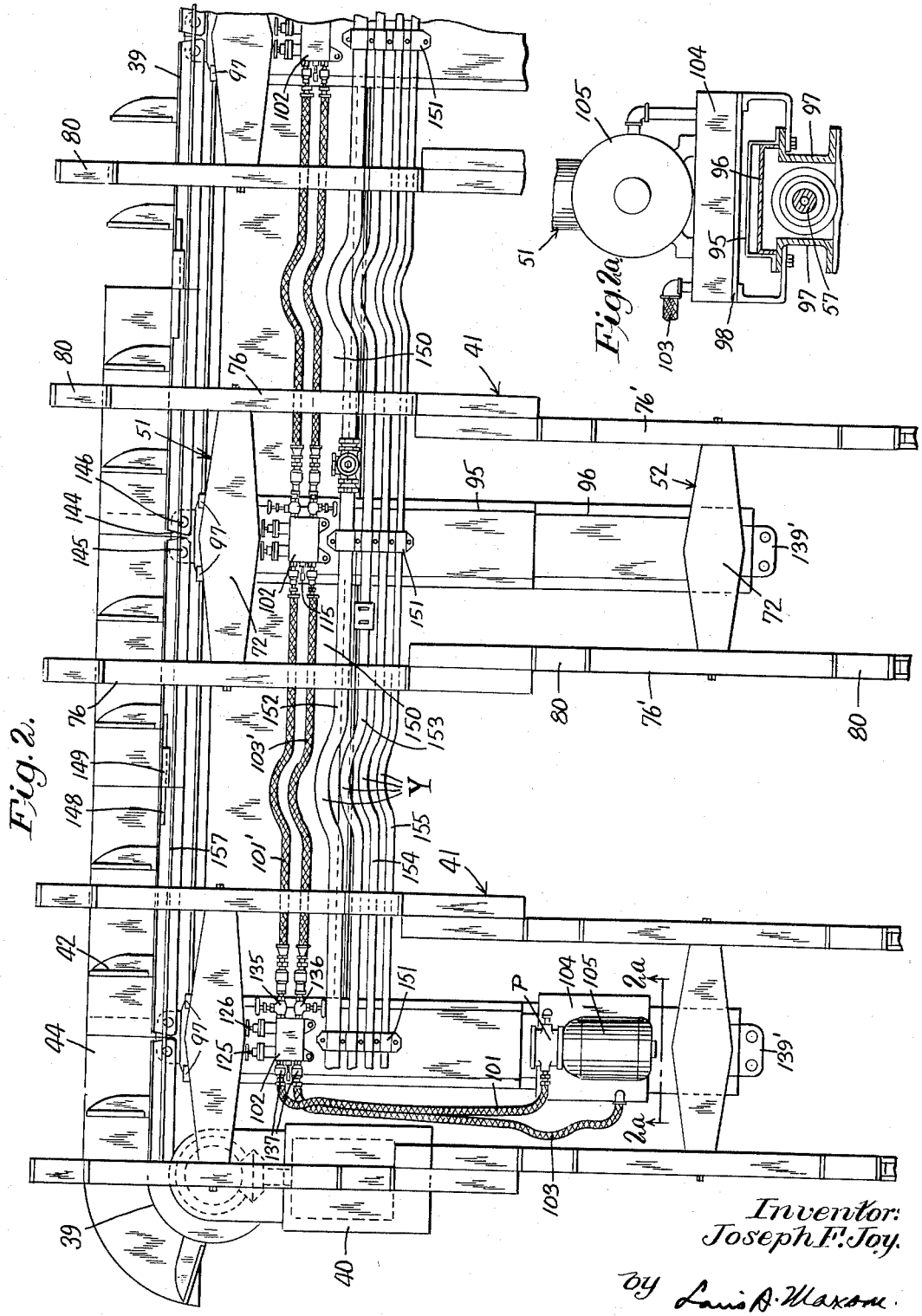

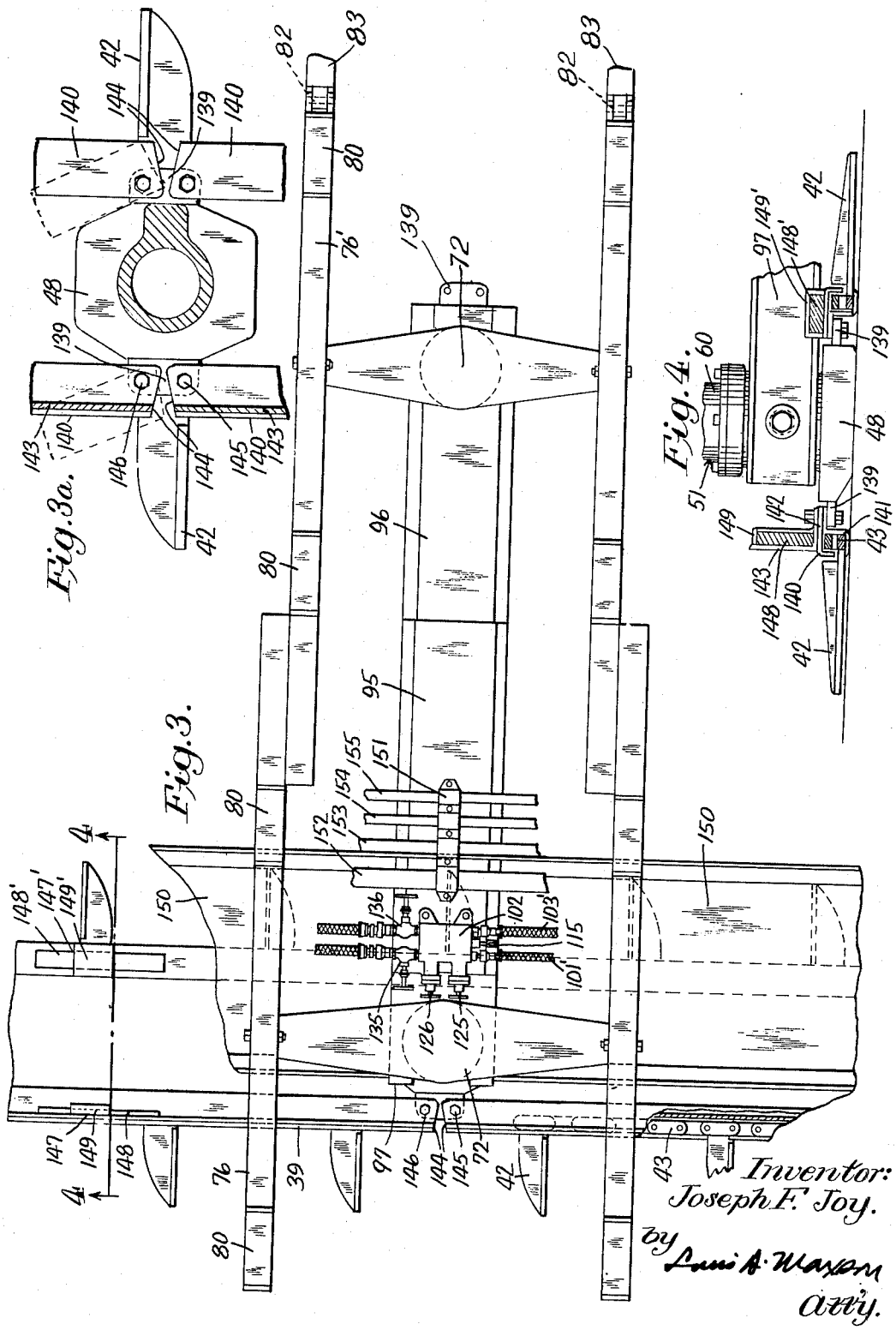

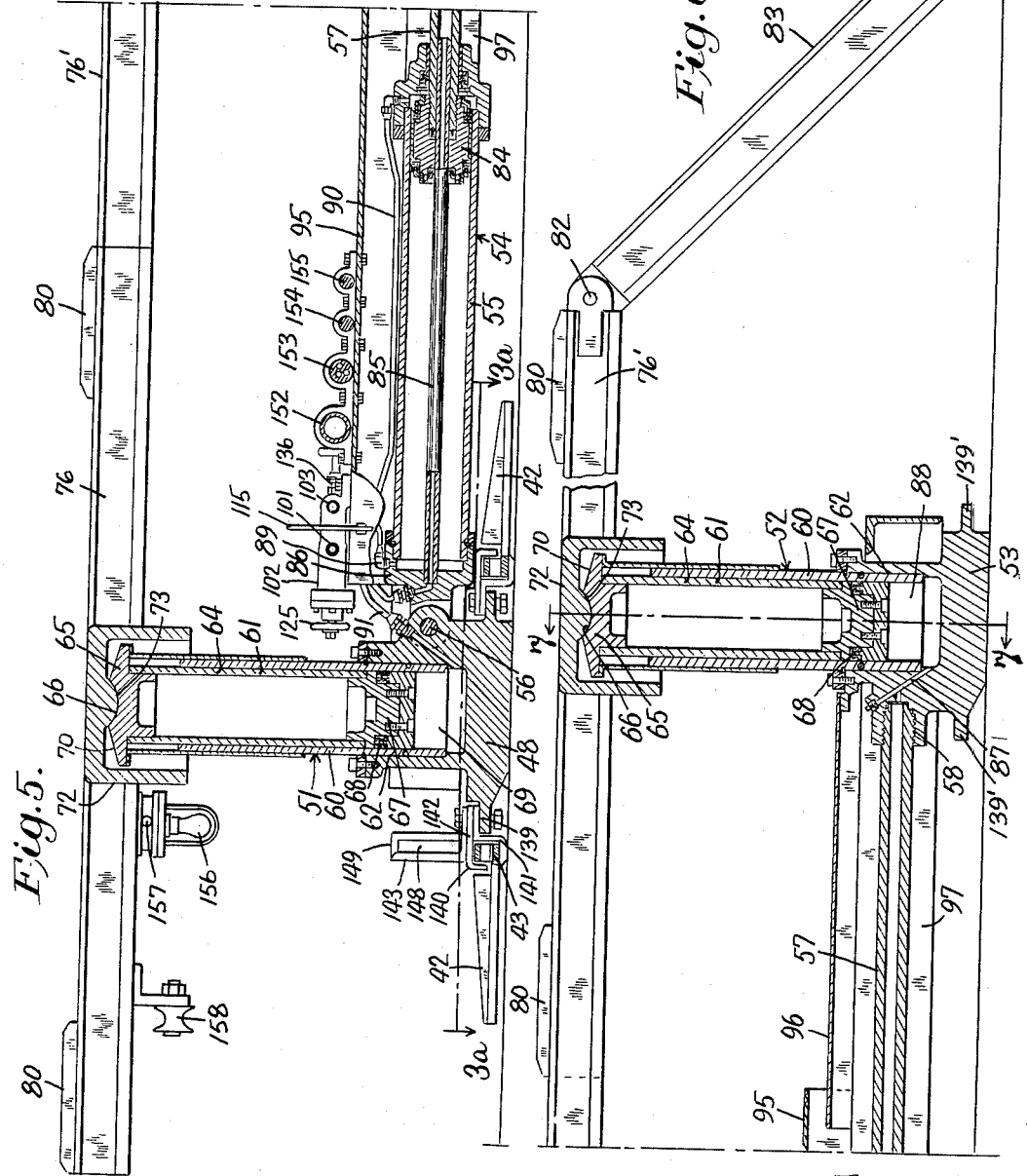

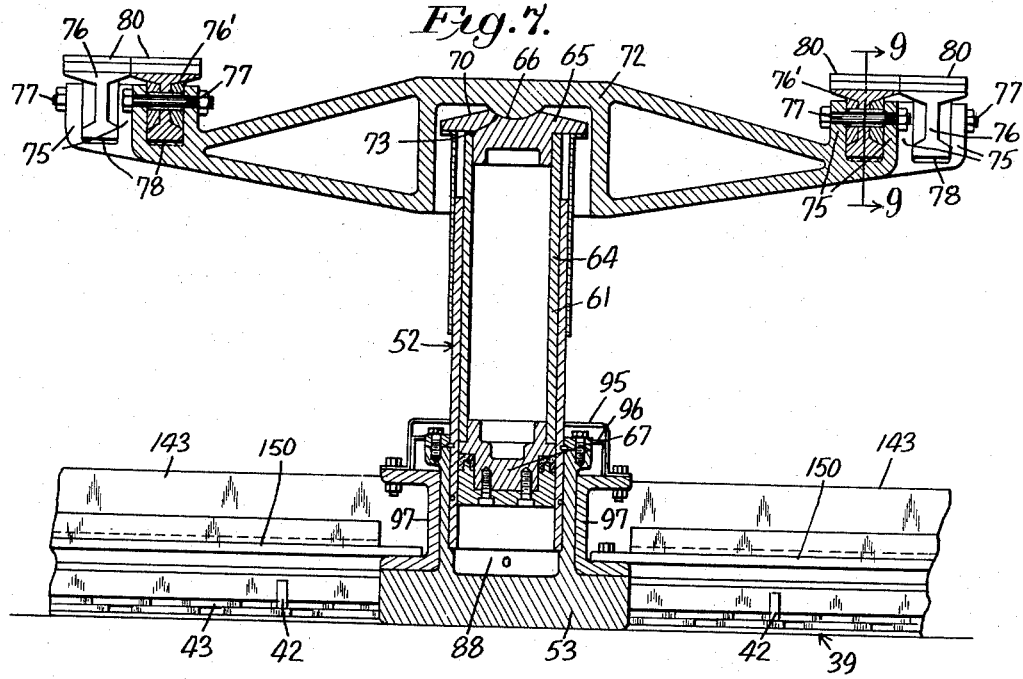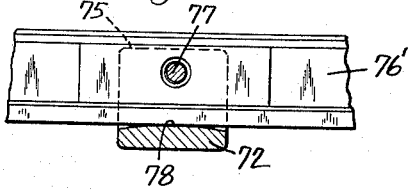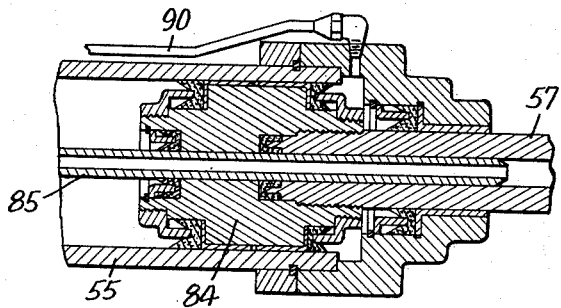

Aug. 2, 1955 J. F. JOY 2,714,505
APPARATUS FOR MINE ROOF CONTROL
Filed May 1, 1948 12 Sheets-Sheet 6
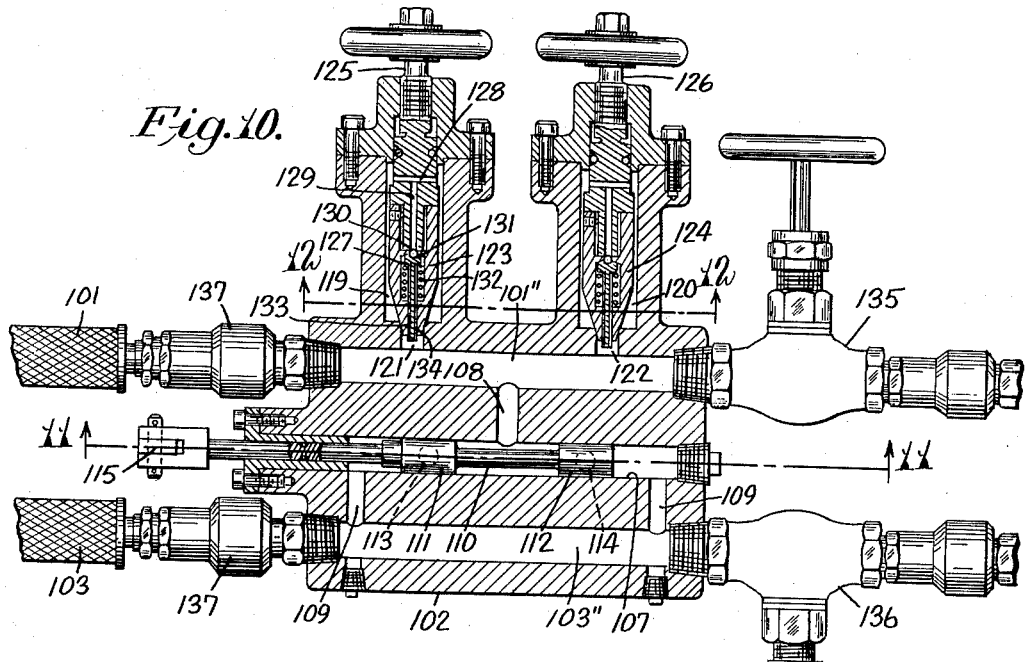
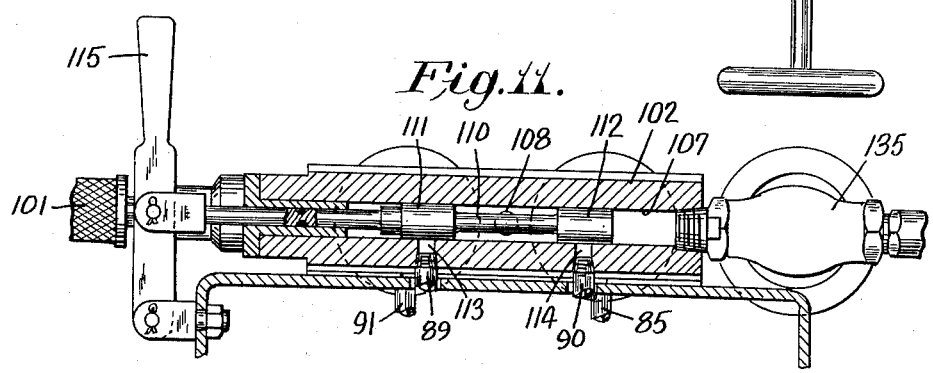
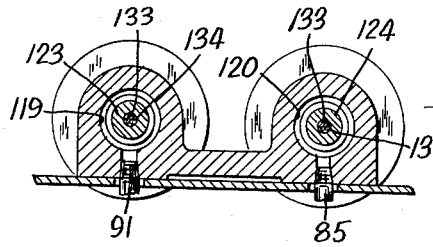
Inventor:
Joseph F. Joy.
by Louis A. Ulakom,
Atty.

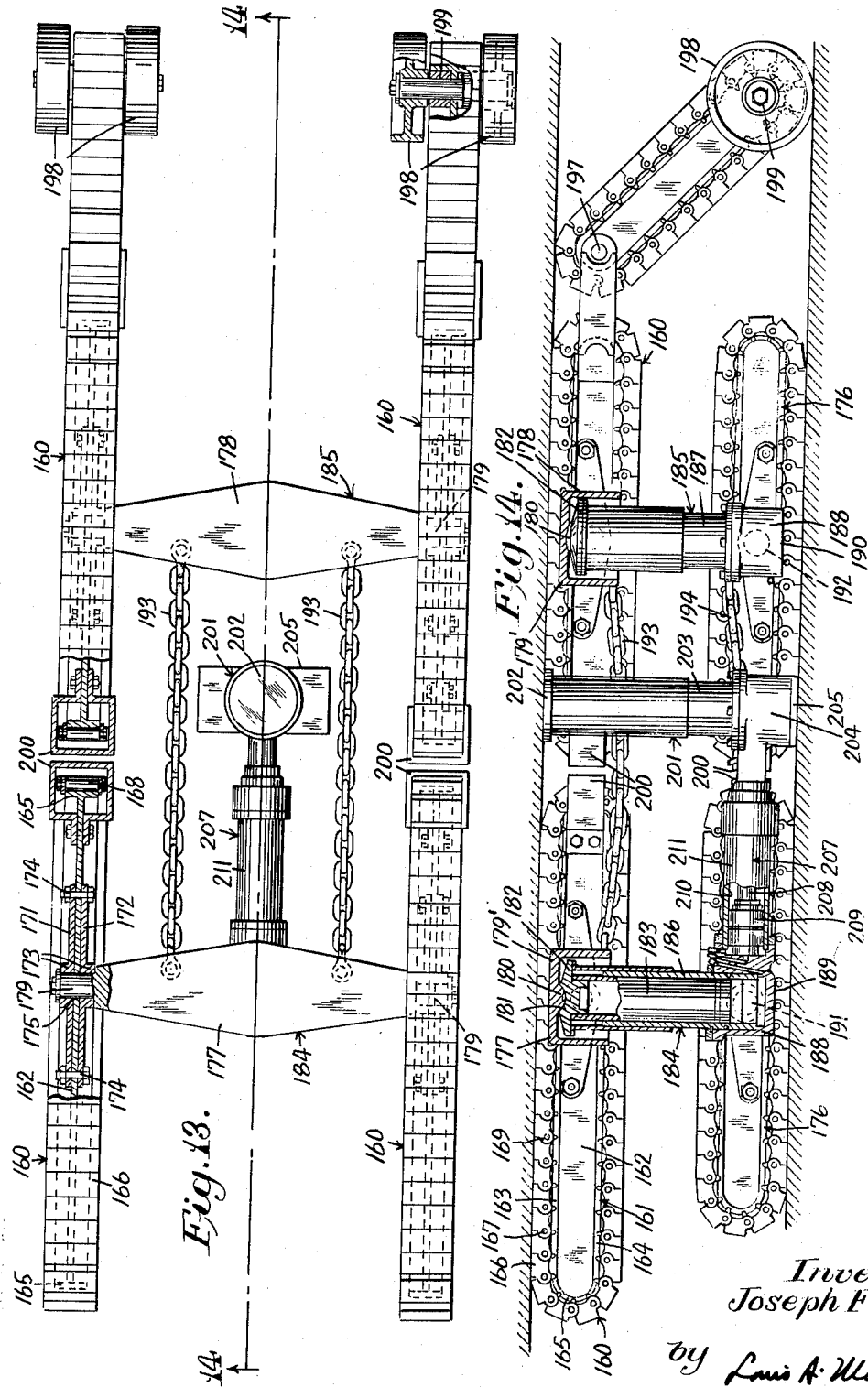

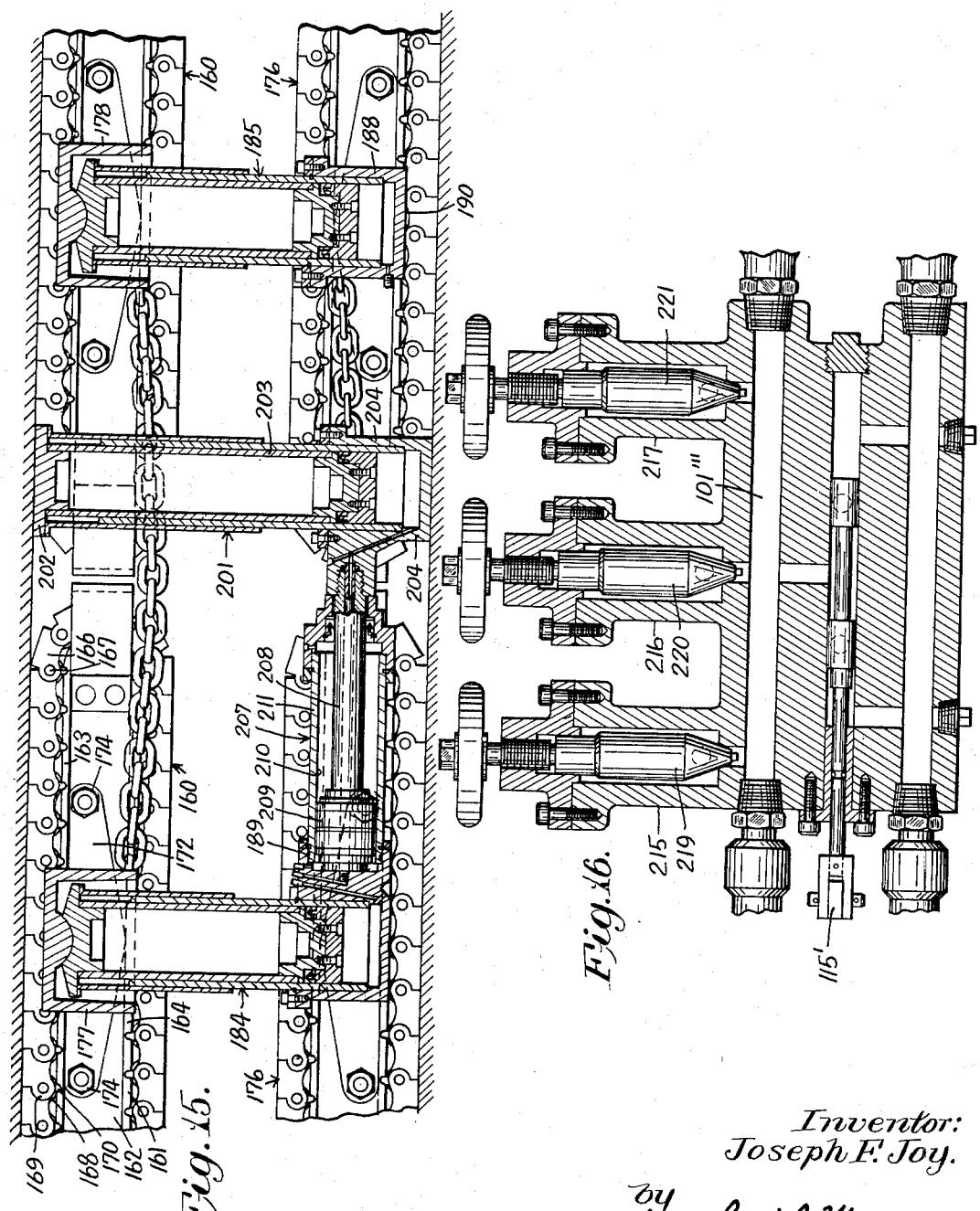

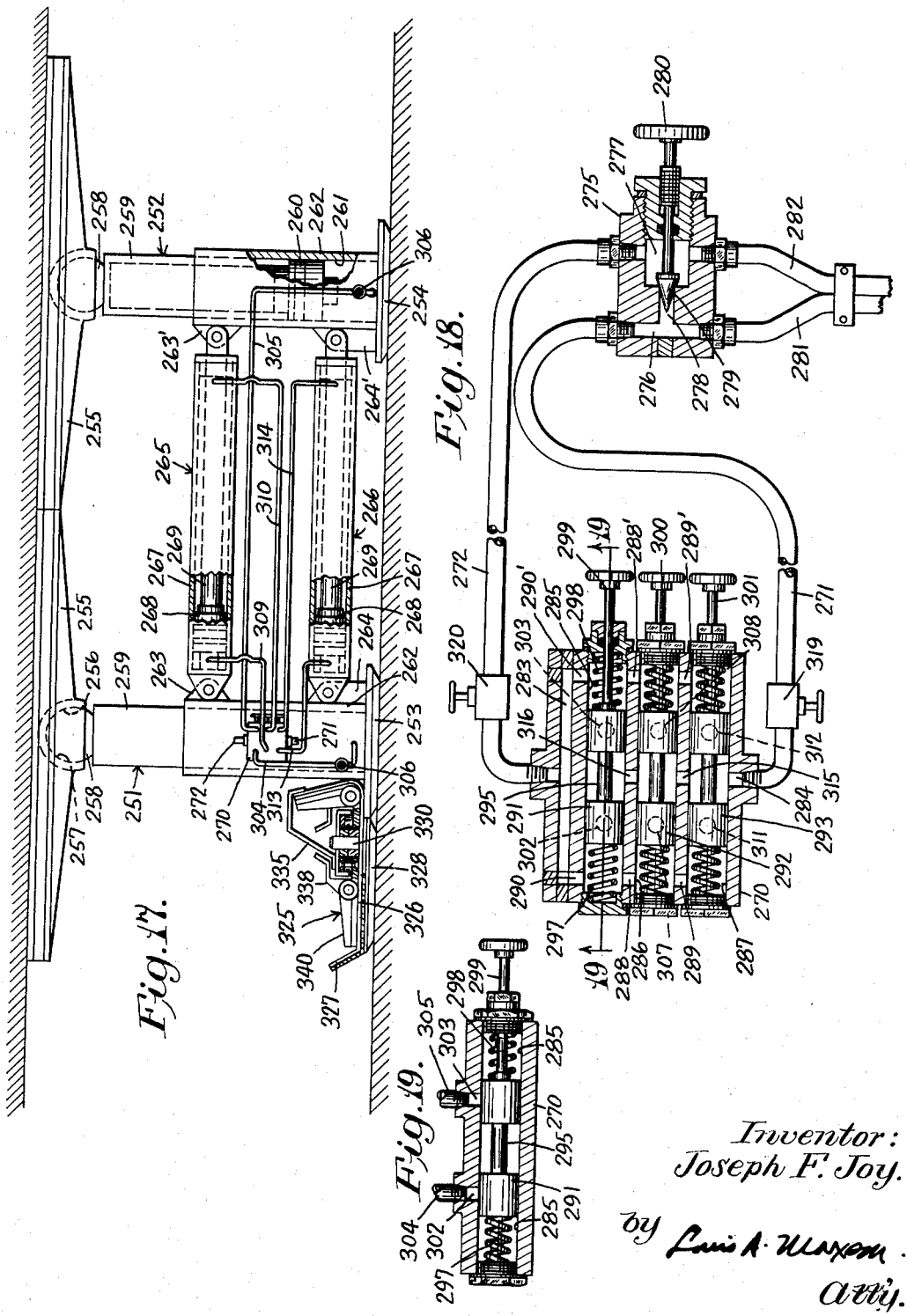

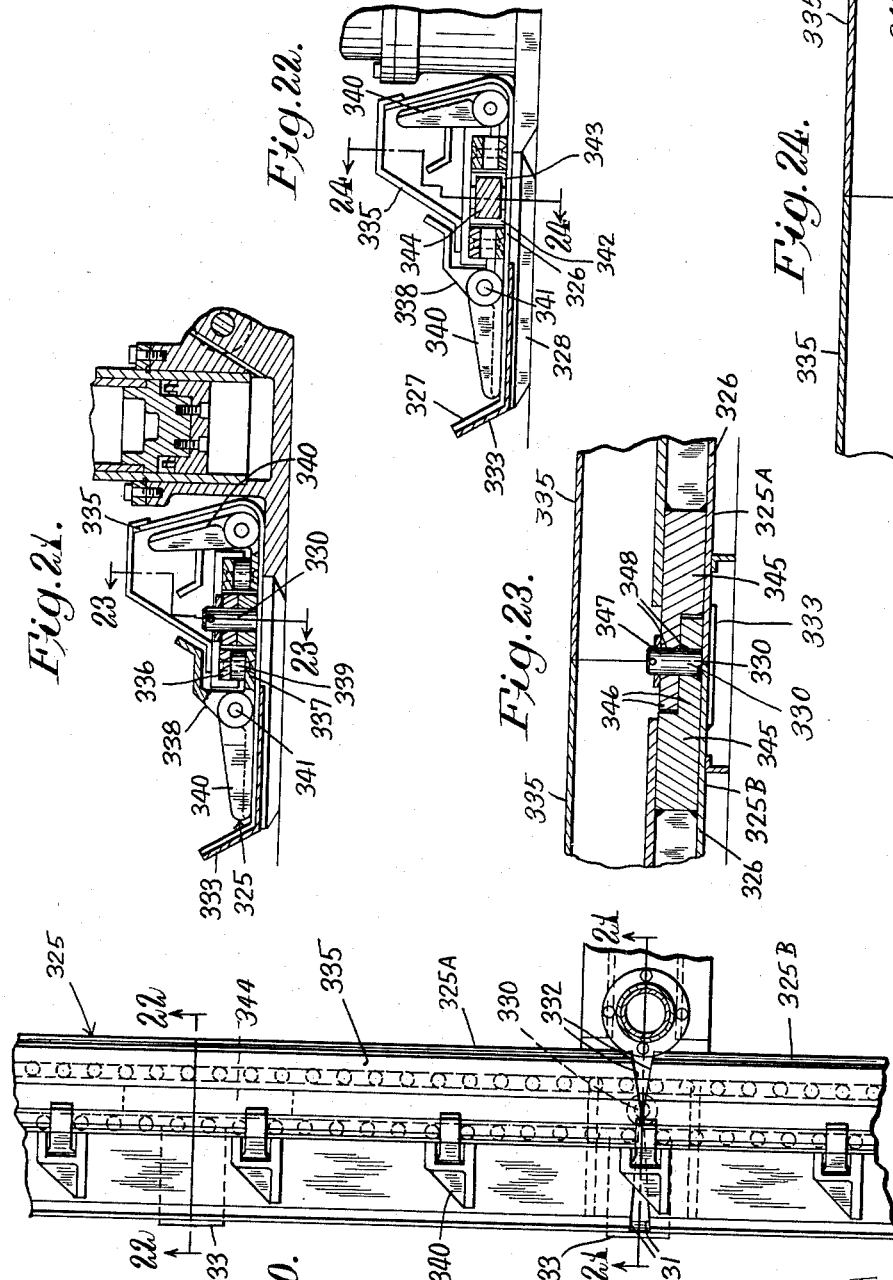

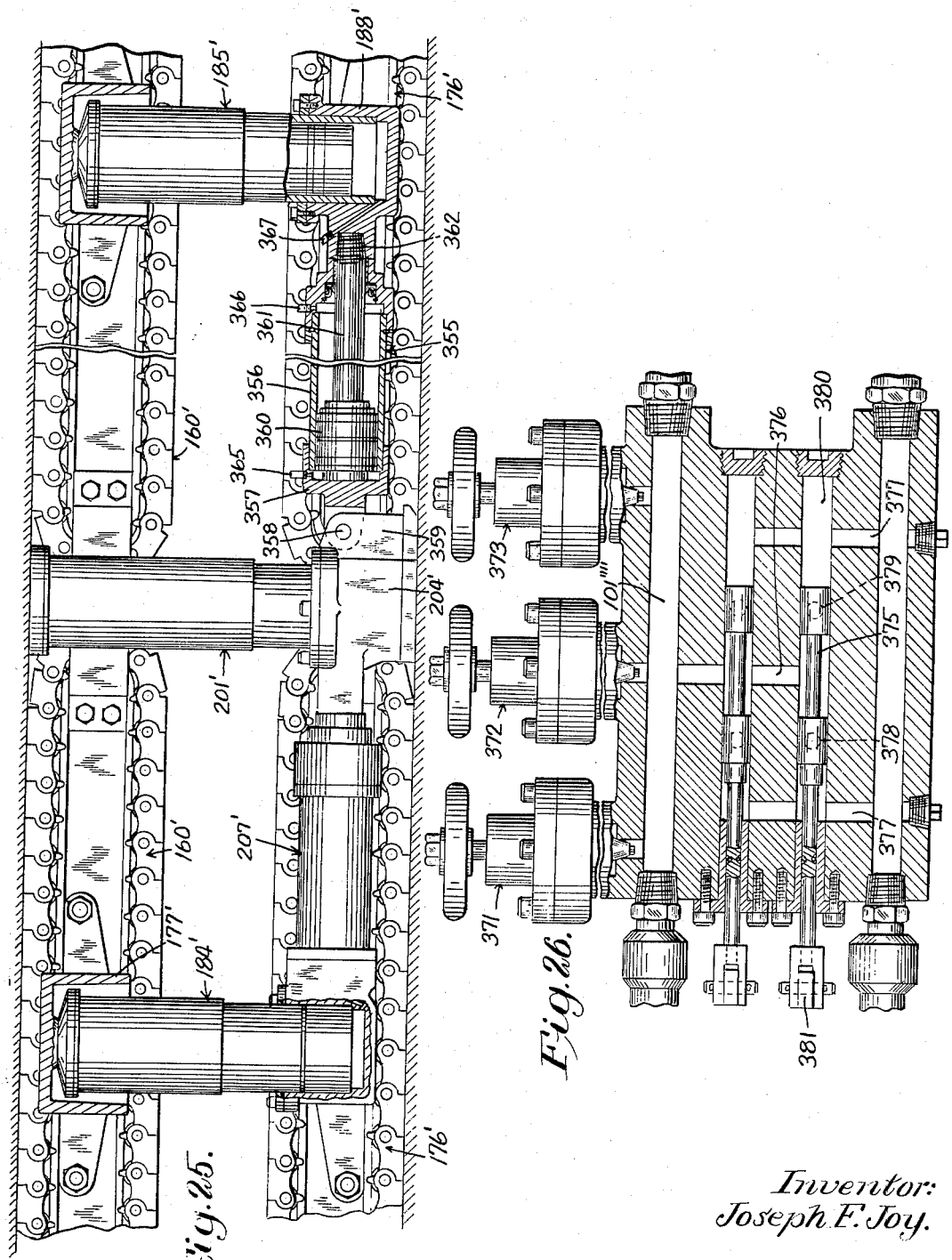

Aug. 2, 1955       J. F. JOY       2,714,505
APPARATUS FOR MINE ROOF CONTROL
Filed May 1, 1948       12 Sheets-Sheet 12
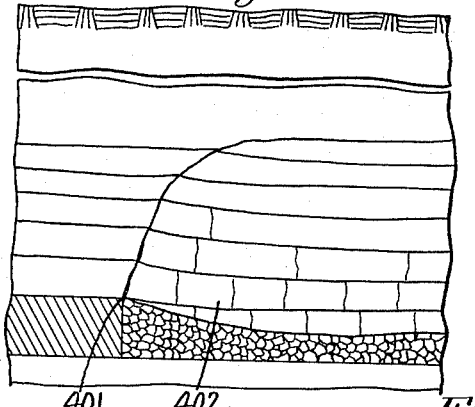
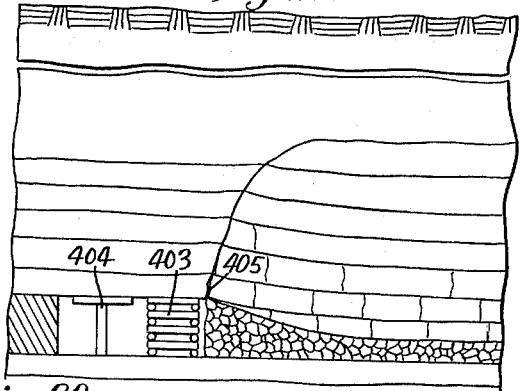
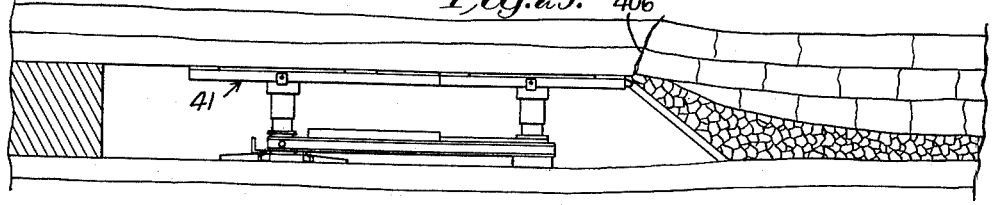
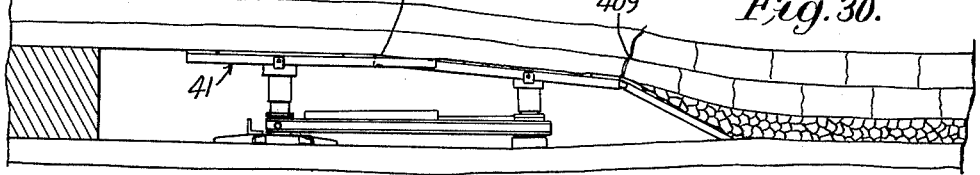
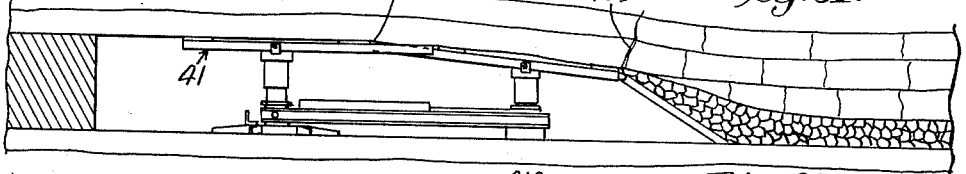
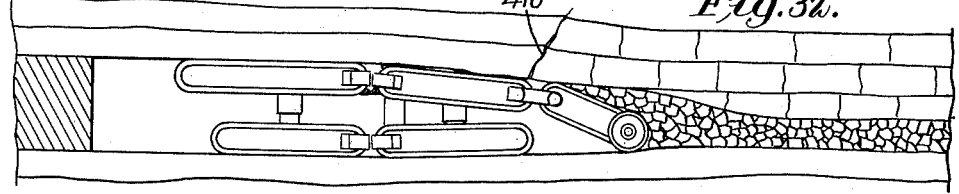
*Inventor:*
*Joseph F. Joy.*
by *Louis A. Maxson.*
*Att'y.*

United States Patent Office 2,714,505
Patented Aug. 2, 1955

2,714,505

APPARATUS FOR MINE ROOF CONTROL

Joseph F. Joy, Pittsburgh, Pa., assignor to Joy Manufacturing Company, Pittsburgh, Pa., a corporation of Pennsylvania Application May 1, 1948, Serial No. 24,574

8 Claims. (Cl. 262—1)

My invention relates to apparatus for mine roof control, and more particularly to apparatus particularly adapted to roof control immediately back of a working face.

Roof control has heretofore been one of the most expensive, as well as troublesome, items with respect to mining. This is true because of the expense of the materials used, such as timbers, steel, brick, etc., and because so much of the materials used is lost as a result of roof subsidence as the working face advances. It is also truce because of the large amount of labor involved in building cribs, setting timbers, etc. Accordingly the provision of an effective and rapidly adjustable means for effecting roof control, and one that is relatively secure against loss of its elements and which can be used many times, is a highly desirable thing. This is particularly so with the present tendency to increase the length of working faces, but it is not without its benefits even with short faces such as are common in room and pillar mining.

The present invention is in no sense limited to such a system, but its understanding may be facilitated by considering its application to an advancing system of longwall mining. Under this system, a working face is opened up and advanced into the solid seam away from the mine shaft or opening. Roadways leading to each end of the longwall face must be maintained open, both to afford openings of sufficient cross section for the requisite air circulation and to permit the transportation of coal from the productive face. These roadways are held open by roadway pack walls—permanent rock cribs so ruggedly constructed that the roadways will not be blocked as the result of roof subsidence. Between the roadway pack walls, and immediately to the rear of the working face, timber in the form of upright posts, and, just back of the posts, wooden or steel cribs are commonly provided to support the roof. Just back of the cribs, either partial or complete caving may be expected to occur. When the partial caving system is used, intermediate rock packs are located at regular intervals between the roadway packs, with the roof being permitted to subside, between the various pack walls, along the face. In the complete caving system, the strata overlying the mined out area opposite the face are permitted to cave in completely, in the areas between the roadway packs, except for the strip or space adjacent the face used for mining and working purposes.

Particularly with the system last mentioned it is important to resist roof subsidence immediately back of the longwall face, and to prevent subsidence or the like except along more or less definite lines in a relatively predetermined space relation to the face as the latter advances. Such a fracture line should be several feet (perhaps a dozen) back from the face, and this can not be certainly accomplished, even with the use of cribs as well as posts, with conventional methods; and, with such arrangements, losses of roof supporting timber are frequent, and at times the fracture line may get too close to the coal face, with resultant expense and time consuming labor.

It will be understood that when the roof commences to subside, the rock ordinarily breaks and falls in fragments of various sizes until the space between the bottom and the roof is completely filled, due to the fact that the broken rock occupies more space than the solid, and the roof is again supported. In some cases the bottom may heave, in addition to subsidence of the roof occurring, in which event the roof and bottom may converge towards a plane below the one and above the other.

It will be understood that in the absence of adequate control, there will be a convergence of the roof and bottom to a more or less degree immediately back of the coal face, and, the wider the face, the more rapidly this convergence may be expected to occur. This convergence is the natural result of the tremendous forces tending to close the space resulting from the removal of the coal seam, and, if the convergence be too inadequately resisted, a fracture of the roof at the coal line is likely to result, interfering greatly with the ordinary production of coal from the working face. With means such as I have provided in my present invention, it is theoretically possible to have the roof fracture just to the rear of the improved roof jacks, but of course the actual composition of the roof and floor strata will affect the results. For example, when fire clay, relatively soft shales or slates lie directly above the roof, there will be a great tendency to fill all of the space resulting from the coal removal, and when the floor is hard, the filling action may be due wholly to subsidence. This filling action may be due partially to subsidence and partly to floor heaving, when the floor is not rigid.

In any event, it is important to provide equipment that will meet conditions (a) where a relatively sharp break may occur just to the rear of the jack devices arranged more remote from the face, (b) where there is a mutual gradual approach between the floor and the roof outwardly of the jacks, perhaps partially under direct control of the outer jacks, and (c) where there is approach of but one of the initially generally horizontal boundaries towards the other.

One desirable arrangement may consist of two vertical hydraulic jacks, each with roof bearing caps or frames, and floor pads. In certain embodiments of the invention these units may have associated with them conveyor structures, supported on brackets, supported on their bases, or ahead of them and positioned to be bulldozed forward by such jacks. Interposed between the vertical jacks there may be horizontal hydraulic cylinder and piston mechanisms for the purpose of advancing the jacks as the face is advanced. The jacks may be provided with hydraulic fluid from any suitable source, and may serve as supports for conduits for spray water, and for electrical conductors, and may be provided with appropriate control valve mechanisms all as later described. There may be associated with the jacks suitable sloping rails or fenders. Separate abutment jacks may also be provided as hereinafter described. The roof-supporting jacks may be connected together so that one may tow the other, as it were. They may be provided with automatic pressure relief valve devices so that they may yield, in the event of excessive roof pressures, rather than break. They may have roof engaging rails or similar structures or one or more of them may be equipped both at the floor and at the roof with arrangements permitting them to avoid having to be slid in contact with the surfaces which they engage. It will be understood that as the face advances, the roof supports will be advanced, and that, as the face is disintegrated and the material is loaded out, the jacks may be advanced as it were in a ripple following the face as its progressive advance across the face takes place.

Heretofore conveyors have been disposed between the timber rows, and back of the front line of props, with the result that, when it was proposed to move the conveyor up as the face was advanced, it was necessary to dismantle the conveyor and move the dismantled parts in sections through the prop line immediately back of the newly placed front line of props. It will thus be evident that to have the conveyors supported by, or bulldozed forward by, the jack structure will mark a great improvement. Many other modifications within the scope of my invention from its various aspects will be later described.

The principal object of this invention is to provide an improved and dependable means for resisting the closing of the gap caused in the earth's strata, by the removal of certain layers thereof such as coal seams or the like, for the required length of time to permit the mining of said layers. Another object is to provide an improved roof supporting structure having control means incorporated therein for facilitating its being progressively advanced along with the advance of a mine face, with but slight or no release of the resistance to roof subsidence. Still another object is to provide improved mechanically actuated structures for the control of mine roofs which support the roof close up to the face along the roof line and sufficiently to the rear of the face at the floor line for the efficient operation of coal producing apparatus entirely forward of the timber line. It is a further object to provide an improved roof jack mechanism. Still another object of my invention is to provide an improved roof control apparatus adapted particularly, but not exclusively, to the control of mine roofs along long faces. Another object is to provide an improved roof jack mechanism which shall permit jack adjustment without interruption of roof support. Still a further object of my invention is to provide an improved roof jack mechanism having improved control means. Another object is to provide an improved roof control apparatus for preventing roof subsidence adjacent the face and for controlling it to an appropriate distance back from the face and adapted to permit complete caving at a greater distance from the face. A further object of the invention is to provide an improved roof jack incorporating improved means for permitting the same to adjust itself to progressive roof subsidence. Another object is to provide an improved roof jack structure so constructed and arranged as to permit adjustment while yet sustaining the roof load. Still another object is to provide an improved roof jack structure having incorporated therein an improved arrangement for facilitating its adjustment without interrupting its supporting action— i. e. while it is yet sustaining the pressure of the roof. Another object is to provide an improved, plurality articulated roof jack structure. Still another object is to provide an improved arrangement of supporting and abutment-forming jacks. Another object is to provide improved roof and floor engaging devices for subsidence controlling mechanism. Another object is to provide improved means for associating a plurality of roof jacks together. Other objects and advantages of the invention will hereinafter more fully appear.

In the accompanying drawings, in which several illustrative embodiments which my invention may assume in practice have been shown for purposes of illustration, Fig. 1 is a horizontal sectional view through a mine at and adjacent to a longwall working face, showing one embodiment of the invention, parts being omitted to avoid complication.

Fig. 2 is an enlarged plan view of the apparatus at the left hand side of the face of Fig. 1, showing a number of features of the invention.

Fig. 2a is a vertical transverse section on the plane of the section line 2a—2a of Fig. 2, with parts omitted.

Fig. 3 is a view showing a pair of the walking jacks, of which more are shown in Fig. 1, the showing being on a slightly larger scale and there being shown a portion of the return run of a flight conveyor and certain sliding connections which are provided in a conveyor flight guiding structure.

Fig. 3a is a horizontal sectional view on the plane of the line 3a—3a of Fig. 5, showing the pivotal feature of the conveyor.

Fig. 4 is an enlarged detail vertical section on the plane of the line 4—4 of Fig. 3, further showing the construction of the sliding connections.

Fig. 5 is an enlarged vertical section of the jack structure nearer the working face, and Fig. 6 shows the associated jack structure more remote from the face, the two views (Figs. 5 and 6) together showing a complete pair of walking jacks according to one embodiment of the invention.

Fig. 7 is an enlarged vertical transverse section on the plane of the section line 7—7 of Fig. 6.

Fig. 8 is an enlarged detail sectional view of a portion of the adjusting cylinder and piston mechanism shown in Fig. 5.

Fig. 9 is an enlarged detail sectional view on the plane of the line 9—9 of Fig. 7, showing the manner of mounting roof engaging rails on the top of one of the jacks.

Fig. 10 is a horizontal section on an enlarged scale showing the control valve mechanism associated with one pair of walking jacks.

Fig. 11 is a vertical section on the plane of the line 11—11 of Fig. 10.

Fig. 12 is a vertical section on the plane of the line 12—12 of Fig. 10, showing further details of the valve mechanism.

Fig. 13 is a plan view and Fig. 14 a sectional view taken on line 14—14 of Fig. 13, with parts shown in elevation, of another illustrative embodiment of my improved roof controlling apparatus.

Fig. 15 is a vertical sectional view showing on an enlarged scale, details of construction of the adjusting cylinder and piston mechanism and of the jacks forming a part of the structure illustrated in Figs. 13 and 14.

Fig. 16 is a sectional view corresponding generally to Fig. 10, and showing the control valve mechanism for the structure of Figs. 13, 14 and 15.

Figure 1:
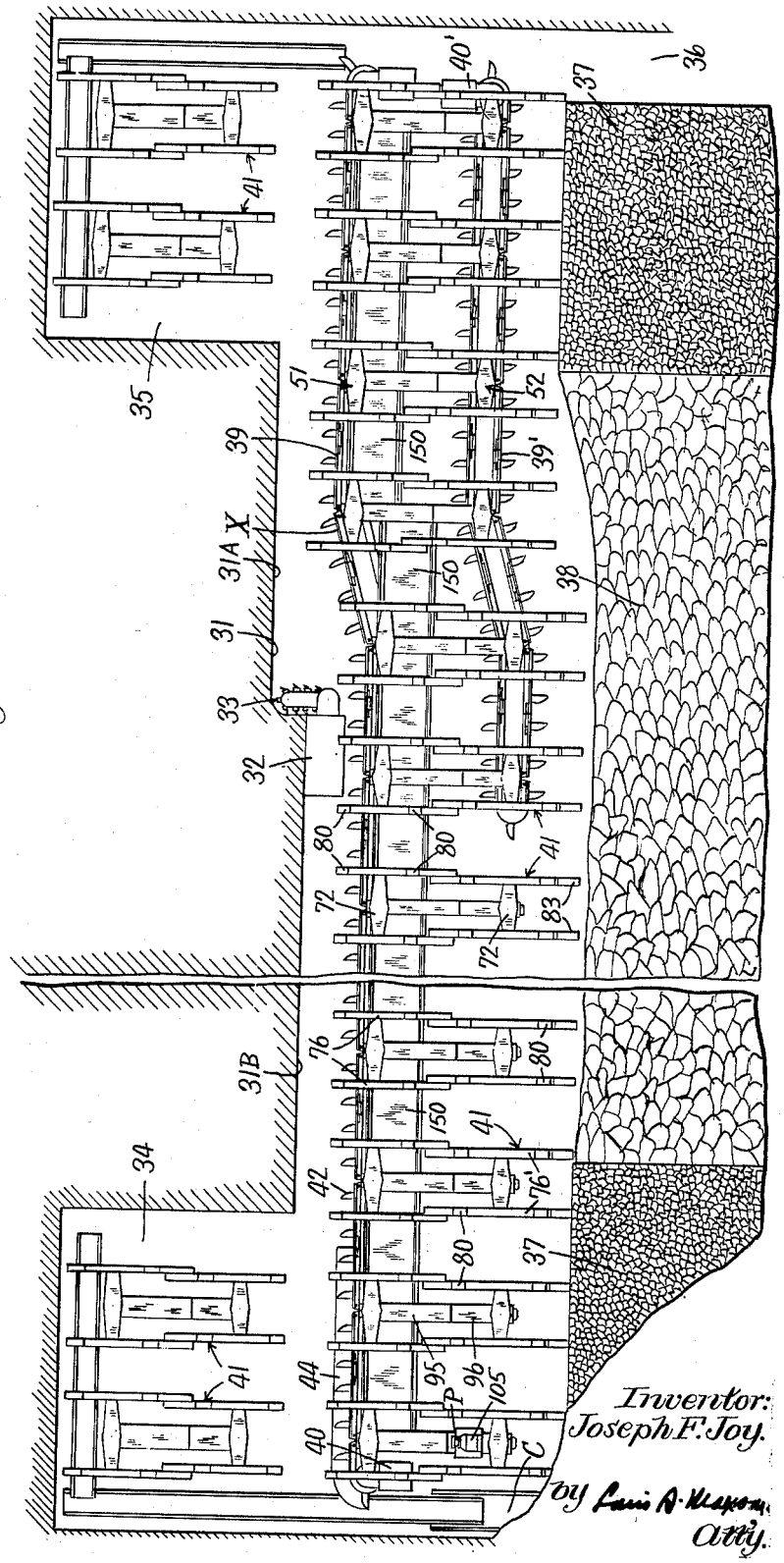

Figs. 17, 18 and 19 are views illustrating another embodiment of my invention, Fig. 17 being a side elevational view with parts broken away to show details of construction, Fig. 18 an enlarged vertical section through a control valve mechanism for controlling the supply of fluid to the various jack devices shown in Fig. 17, and Fig. 19 being a fragmentary horizontal section on the plane of the line 19—19 of Fig. 18.

Fig. 20 is a plan view of the conveyor shown in Fig. 17, with a fragmentary view of a jack mechanism.

Fig. 21 is an enlarged cross sectional view on the plane of the line 21—21 of Fig. 20.

Fig. 22 is an enlarged sectional view on the plane of the line 22—22 of Fig. 20, showing a sliding connection enabling the conveyor to have one portion thereof adjusted laterally into and out of line with another portion thereof.

Fig. 23 is a vertical section on the planes of the section line 23—23 of Fig. 21.

Fig. 24 is a section on the planes of the lines 24—24 of Fig. 22.

Fig. 25 is a view with further parts shown in elevation, but somewhat similar to Fig. 15, showing a further modification which the invention may assume in practice.

Fig. 26 is a view partially in elevation and partially in section, showing a control valve mechanism appropriate for the control of the apparatus of Fig. 25.

Figs. 27 to 32 are diagrammatic views explaining or illustrating the problem which the present invention is designed to solve and some of the special forms which the problem may assume, and the manner in which these are met.

Referring first to Fig. 1, it will be observed that a longwall face is illustrated at 31. This includes a portion 31A which has been advanced one cut of a kerf-cutting machine beyond the portion 31B, which still remains to be advanced to a position in alinement with the portion 31A. A kerf cutting machine, which may assume, obviously, various forms, is shown at 32 and has suitable mechanism 33 for disintegrating, or for cutting so that the pressure may disintegrate, the coal. The face has at its opposite ends stalls 34 and 35; and roadways, of which one is shown at 36, are provided, for ventilation and coal removal purposes, and communicate with the stalls. These roadways are held open by roadway pack walls 37, and as the system of mining is intended to operate according to the substantially complete caving method, the roof is indicated at 38 as having caved between the adjacent sides of the roadway pack walls. A conveyor 39 extends for the full length of the face, being spaced therefrom only by the necessary distance to permit the handling of the coal cutting or disintegrating equipment, and extending also pretty well across the spaces at the mouths of the stalls 34 and 35 and into close adjacency to a conveyor C leading out of the section of the mine from which coal is being taken out.

Any suitable means may be provided for extending the stalls and maintaining them in advance of the actual working face. The conveyor 39 may be driven by any suitable means, such as the conveyor drive conventionally shown at 40, it being possible to provide one or more of these drives as, for example, a relatively powerful drive at the delivery end of the conveyor 39, and a lighter drive at the opposite end, where the principal work done is the moving of the flights back to the point of commencement of their run across the face. As will later appear, the conveyor is so constructed that it may have portions of its guides telescope as necessary adjacent the points where the "jog" in the face exists as the cutting proceeds.

In Fig. 2, the conveyor 39 is shown as comprising flights 42, moved by a chain 43 (see Figs. 3 and 4) in suitable guides later described. The flights travel over the mine bottom except near the discharge end of the conveyor, where a series of plates 44 are provided to form a ramp surface over which the coal is elevated for discharge into a conveyor C.

For the purpose of preventing roof subsidence, both in the stalls and along the working face, I have provided roof pack mechanisms which are generally designated 41. These, by their construction and spacing are adapted to hold the roof from caving except in the manner and to the extent desired.

The jack structures of the first embodiment of the invention are best disclosed in the composite view made by taking Figs. 5 and 6 together. It will be observed that the jacks include a forward upright jack 51 and a rearward upright jack 52. The jack 51 is supported on a base or pedestal portion 48, and the jack 52 on a base or pedestal portion 53. There is a cylinder and piston mechanism 54 extending between the pedestal members 48 and 53. The cylinder member 55 of the cylinder and piston mechanism is pivotally connected at 56 to the pedestal 48, while the piston rod 57 of the cylinder and piston mechanism 54 is shown as rigidly connected at 58 to the pedestal or foot member 53. Thus a certain amount of out-of-parallelism may occur between the jacks. Each of the upright jacks 51 and 52 consists of a cylinder member 60 in which a tubular piston member 61 is reciprocable. The cylinder member 60 is suitably mounted as at 62 on its respective pedestal member, and the piston member 61 includes a sleeve portion 64 which supports an end member 65 having a concave socket 66 therein, and the lower end of the piston member 61 has a multi-part piston 67, between the parts of which a packing 68 is provided. It will be obvious that the admission of fluid to the space 69 beneath the piston 67 of the jack 51 will exert a force tending to raise the head 65, and the venting of fluid from this space will tend to lower the head 65. The head 65 has a rather flat-angled, frusto-conical surface 70 surrounding the concavity 66; and a transverse member or arm of generally boxlike form and open at its bottom is shown at 72 and has a convex portion 73 adapted to seat in and to rock in the concave seat 66. At the ends of the transverse member 72, whose structure is more clearly shown in Fig. 7, there are upstanding flanges 75 between which rail portions 76 are held against material longitudinal movement, and also against escape, by a bolt 77; and these rail portions at their lower sides rest upon convex surfaces 78 providing fulcra on the arms 72 between the flanges 75. It will thus be apparent that there is supported by the head 65 an arm structure which can rock transversely of the jack mechanism and which can also tilt forwardly and backwardly, and that at the ends of the arms of the arm structure there are provided longitudinally extending rails which can tilt about transverse axes, rocking on the surfaces 78, but which are held against lateral tilting relative to the arm structure, these rails being adapted to engage and support the roof and having pad portions 80 at or near their respective forward and rearward ends so that the engagement with the roof may certainly be near the ends of the rail structures instead of perhaps being concentrated, as might occur with an irregular roof, if there were no pads, close to the axis of the cylinder and piston mechanism.

The structure of the jack 52 corresponds so very closely with that of the jack 51 that a detailed description is unnecessary, but it may be noted that the rails 76' associated with the jacks 52 carry hingedly connected to them at 82 downwardly sloping rail portions 83 constituting fenders upon which the subsiding roof may rest. These fenders will prevent a flow of roof fragments beneath the rearward roof supporting rails from interfering with the jack mechanism, these fenders also exerting forward thrust on the rearward jack when engaged by the subsiding roof and thus making the walking operation easier and preventing the roof from pinching the jacks. The rails 83 may simply slidingly engage the mine bottom at their lower ends.

It has been brought out that a cylinder and piston mechanism 54 extends between the jacks 51 and 52; and the piston rod 57 carries a piston 84 which is hollow, as is the piston rod, so that a stationary fluid supply conduit 85 mounted in the forward head 86 of the cylinder member 55 may have the piston and piston rod freely slide upon its exterior. Fluid may be supplied to the rear jack through the supply conduit member 85 and the hollow piston rod 57 and through a passage 87 to a chamber 88 at the bottom of the rear jack 52. Fluid can be supplied to the front end of the bore of the cylinder 55 through a conduit 89. Fluid may be supplied to the rear end of the bore of the cylinder 55 through a conduit 90; and fluid may be supplied to the chamber 69, previously mentioned, in the bottom of the jack 51, through a conduit 91.

For the purpose of supplying fluid to the jacks 51 and 52 and to the opposite ends of the cylinder and piston mechanism 54, valve mechanisms are arranged on a deck element 95 which cooperates with a telescoping deck element 96 to protect the piston rod 57 against falling debris and scoring. The deck element 95 is secured to the head 86 of the cylinder and piston mechanism 54 and the deck element 96 is secured to the pedestal member 53. The pedestal member 53 has channel irons 97, cross connected at their rear ends, slidably engaging the opposite sides thereof, and these are pivotally secured to the pedestal 48 at the sides of the latter, on horizontal pivots (see Fig. 4) shown at 97'.

Figs. 10, 11 and 12 show the valve mechanisms associated with each pair of walking jacks according to the present embodiment of the invention. Before describing these structures, it may be noted that fluid under high pressure may be supplied from a motor driven pump P suitably located, and herein shown in Fig. 2a as located on a deck 98 supported by the channel irons 97, 97. From this pump a discharge line 101 leads to the first control valve box 102, the one associated with the jack mechanism which carries the pump P in Fig. 2. A return line 103 leads back to a sump or reservoir 104 on which the motor 105 driving the pump P is arranged. Extensions 101' and 103' of the conduits 101 and 103 connect the valve box associated with each jack with the valve box of the next adjacent jack, and there will be provided beyond the final box—the box the most remote from the pump—a U-connection (not shown) to establish communication between the conduits 101 and 103 so that there may take place a flow of fluid with only the resistance to flow in the conduits, freely between the pump discharge and the pump intake, except when it is desired to connect a jack or a cylinder and piston mechanism with liquid under pressure, and the steps later described to accomplish this are taken.

Now, noting the structure of the valve boxes 102, it will be seen that each of these has three parallel bores or passages in it, a passage 101" which is adapted to establish a connection between the conduit 101 and a conduit 101' or between two conduits 101'. There is another longitudinal passage 103" which is adapted to establish a connection between the conduit 103 and a conduit 103', or between two conduits 103'. There is an intermediate bore 107 connected with the passage 101" by a central conduit 108 and connected adjacent its ends by passages 109 with the opposite ends of the conduit 103". A piston type, two-spool valve 110, when in central position, has its spools 111 and 112 in positions closing the mouths 113 and 114 of the conduits 89 and 90 leading to the opposite ends of the cylinder 55. It will be evident that movement of the piston valve 110 in one direction or the other from its central position will result in the admission of fluid to one end or the other of the associated cylinder and piston mechanism 54, and either advance of the jack 51 relative to the jack 52 or bringing up of the jack 52 relative to the jack 51. In any case, which jack will move will depend usually on the relative pressures in the chambers 69 and 88. Any suitable operating mechanism, such as is shown in Figs. 10 and 11 and including a control handle or lever 115, may be provided for shifting the position of the valve 110. The conduits 91 and 85, leading to the chambers 69 and 88 respectively, are in communication with chambers 119 and 120, which are communicable through ports 121 and 122 with the passage 101", which will be recognized to be a fluid supply passage. Valve elements 123 and 124 are provided to control the ports 121 and 122, and these are provided with screw and nut and wheel mechanisms 125 and 126 by means of which they may be opened or closed at will. These valves are provided with safety or relief valve means 127, for the purpose of preventing breakage of the jacks in the event that the roof subsides more rapidly than was anticipated and builds up a dangerous pressure in the jack cylinders, which, it will be appreciated, are normally cut off from communication with the supply except when their position is to be adjusted. These safety valve structures include transverse passages 128 extending through the valves, longitudinal passages 129 in the valves, leading to valve seats 130, valve elements 131 normally held against the seats 130 by springs 132, and grooved stems 133 or a similar bleeder arrangement, leading through passages 134 into communication with the passage 101". It will be evident that if the roof subsides with sufficient force to build up a dangerous pressure in the chambers 69 or 88, when these are cut off from the passage 101", this pressure will be transmitted through one or the other of the cross passages 128 and a longitudinal passage 129 and raise one of the valves 131 from its seat and thereby establish communication between the jack and the passage 101", in which the pressure, at most, will not exceed the predetermined discharge pressure of the pump P. Note that this pump will have a usual relief valve (not shown) connected with its discharge, and with the reservoir 104, to prevent subjecting of the jack mechanisms to excessive supply pressure. It may be noted that the relief valve will ordinarily be set at a pressure considerably higher than the pressure which can be built up within them by the fluid supplied from the pump. The connections 101" and 103" at the sides of the valve boxes 102 more remote from the pump will each be provided with a suitable stop valve, these being indicated at 135 and 136, the former associated with the conduit 101' and the latter with the conduit 103'. Quick detachable connections are shown at 137, these being of a familiar type, for example, the well known Hansen couplings, and being furnished so that the jacks may be quickly connected up or disconnected, as may be desired.

The operation of the jacks will be clearly apparent from what has been so far said, at least with respect to this present first form of the invention which I have just been describing. When the motor 105 is driving the pump P and none of the stop valves 135 and 136 is closed, there will be a free circulation of fluid through the apparatus as a whole, the fluid flowing out through the conduit 101, the passages 101" and conduits 101', through the U-connection previously mentioned, or its equivalent, and back through the lines 103', the passages 103", and the line 103 to the reservoir 104.

Let it now be supposed that the entire system has no liquid under pressure in any of the jacks, and that the pump is running, and that it is desired to set one of the rearward jacks 52. In order that there may be pressure to deliver to the jack, a logical thing to do will be to close the stop valve 135 just beyond the box 102 associated with the jack mechanism which is to be made operative. Pressure will then build up in the passage 101" to the full discharge pressure of the pump as set by its associated relief valve, and, upon opening of the valve 124 by its associated hand wheel 126, fluid will be admitted through the port 122, the valve chamber 120, and the conduit means including the conduit 85, the hollow piston rod 57, and the passage 87 to the chamber 88, and the jack 52 will raise its supported roof engaging rails until the pads associated therewith engage the roof firmly. When the jack has been extended and the desired pressure is being exerted, the hand wheel 126 will be used to close the valve 124. Next it may be desired to move forward the jack 51. To do this the valve 110 will be moved into a position to supply fluid to the mouth 113 of the conduit 89. Note that in Figs. 5 and 6 the position of the parts is such as results from such a supply of fluid, and not the position which precedes such a supply of fluid. When the jack 51 has been advanced as far as is desired, the valve 110 will be returned to mid-position and fluid will then be locked in the chamber ahead of the piston 84 within the cylinder 55. It may then be desired, and will be, ordinarily, to supply pressure to the jack 51, and this will be accomplished by opening the valve 123. When this jack has brought its rail pads into full pressure engagement with the roof, the valve 123 will be closed, and ordinarily the parts will remain in the relationship specified until the advance of the face makes it desirable to move up the rear jack and advance the forward jack another step, though the rear jack might be more promptly advanced if desired. The manner of doing this will, of course, be evident from the steps which have been so far described. If the roof is relatively smooth, only a very small amount of pressure, at most, would have to be released by the rearward jack before it could be moved forward, and correspondingly, only a very small amount of pressure would need to be released by the forward jack before it could be advanced relative to the rearward jack. Thus, any substantial danger of subsidence of the roof will be avoided. It will be understood that as soon as the necessary adjustments are made at any jack unit, that one of the valves 135 and 136 which may have been closed, will ordinarily be opened, and that jacks to the right in Fig. 1 of any closed valve 135 will not be capable of obtaining fluid under pressure until such closed valve 135 is reopened. For this reason it may be desirable to close a valve 136, instead of a valve 135, because this will allow pressure to be delivered to the whole series of jack mechanisms upon the opening of the individual jack control valves. Ordinarily, with cutting proceeding from right to left along the face and with the right hand portion of the face being advanced before the left hand portion is advanced, the jacks will be moved up, starting at the right end of the series, just as rapidly as this is possible, and they will move up the associated sections of the conveyor device 39 as they move. If the roof pressure gets too heavy in any jack cylinder—and reaches the setting of the relief valve associated therewith—one of the relief valves 131 will open to relieve the pressure.

As has been previously observed, the jack mechanisms, which may well be termed "walking" jacks, have associated with them the conveyor mechanism 39 of the flight type for delivering the coal to the conveyor C. The flights 42 of this conveyor are secured to a continuous chain 43 whose opposite runs pass forwardly of and just to the rear of the bases 48 of the forward jacks, and the forward ends of the roof engaging rails associated with the forward jacks project forwardly beyond the path of the moving flights and at least partially over the space in which the cutting or disintegrating apparatus travels along the face. The bases 48 have flanges 139 to which guides 140 are secured, and the chains 43 move in the guides 140, which consist of lower guide elements 141 and upper guide elements 142, and the face-side upper guide elements have a material guiding flange 143 supported on them. These guides are made in sections with oblique ends as at 144 (see Fig. 2) so that as a walking jack advances, as at the point X in Fig. 1, the guides may not pinch, it being noted that the adjacent ends of two guide sections are pivotally connected as at 145 and 146 to a pedestal or base 48. As the guides must lengthen during the advance of one forward jack relative to another, slip joints of the tongue and guide type are provided between the ends of each section, as at 147 and 147'. It will be observed that the sections are each made in two parts, with their adjacent ends provided, the one with a tongue 148 or 148' and the other with a guide 149 or 149' for the cooperating tongue. The connections 148, 149 are edge up, those 148', 149', flat side up.

The jack bases 53 are also flanged as at 139', and these may have conveyor guides secured to them for a flight conveyor 39' (see Fig. 1) for moving pieces of rock for the roadway pack wall 37 at the right. The structure of this conveyor may be essentially the same, except for necessary reversals of parts, as the conveyor 39, and may have a drive 40' of suitable type, as at the extreme right hand jack mechanism.

It will also be observed that the adjacent ends of the roof engaging rails on front and rear jacks overlap, and that the spacing between jacks is such that the spacings of the rails all along the face is essentially similar, from jack to jack, as from rail to rail on a single jack.

It may also be noted that deck plates 150, 150 extend from channel 97 to channel 97, and that by means of suitable clips or clamp elements 151, a spray water conduit 152, a power and control cable 153 for the coal cutter or disintegrator and for any right side conveyor drive, a low voltage cable 154 and a signal cable 155 may be held in position, with suitable slack provided between adjacent jack mechanisms as shown in Fig. 2 at Y. Lights 156, connected by suitable cable 157, and rollers 158 for the support of flexible cable connections to the coal cutter or disintegrator may be supported from the rails extending forwardly from the jacks 51.

In the form of my invention which I have described so far, it is a virtual necessity to reduce at least somewhat the pressure existing in whichever jack is to be moved, before jack movement will be possible. The jacks will normally have the same hydraulic pressure in them when they are loaded, and this would mean, unless the loading pressure were reduced on the jack which it was desired to have moved relative to the other jack, that which one of the jacks would move would depend on the mere circumstance of which happened to have a firmer engagement with the mine roof and/or with the mine bottom. In other words, it might be that when it was desired to advance the rearward jack, that is, to bring it up towards the forward jack, so that the latter might thereafter be moved closer to the face, the rearward jack would not move at all, unless the pressure which it exerted was reduced.

For the purpose of maintaining as effectively as possible a support for the roof and for avoiding the necessity for reducing the roof support during jack movement, I have illustrated in Figs. 13, 14 and 15, a modification of my invention which is intended to permit jack movement without relief of the pressure of the jacks which are sustaining the load of the mine roof; and I do this by providing a jack which provides a firm abutment against which thrust can be exerted to effect movement of the roof supporting jacks, that is those jacks which have as their primary function roof support, and by relieving of pressure, to the necessary extent, the abutment providing jack when occasion exists for moving this latter jack forwardly to a new position. In this form of my invention shown more particularly in Figs. 13 to 15, I also provide the equivalent of the alined rails and the inclined rail to the rear of the second set of rails, but all contacts, except in the case of the abutment jack, between the mine bottom and the jack structures and the mine roof and the jack structures is through apparatus which will not require sliding of mine roof and floor engaging means against a serious frictional resistance. In other words, I provide, as parts of the floor engaging and of the roof engaging devices which are to transmit the forces to the floor and to the roof, trackways upon which roller supported shoes are mounted, these trackways being made desirably of I-beam construction, with the flanges carried around semi-circles at the ends, with trackway engaging rollers supported on the pintles which connect floor and roof engaging, tread forming elements, and with the tread forming elements formed of simple shoe-like construction with side projections to keep them from slipping laterally off the flange portions of the I-beam trackways. Desirably, I may provide connections between the upper and lower pairs of frames which are associated with each of the roof supporting jacks so that there may be free pivoting about transverse horizontal axes in the case of the lower elements and, with respect to the upper elements, there may be, not only a longitudinal rocking possible, but also a lateral capacity for adjustment so that if the roof is not completely flat (that is not completely parallel to the mine bottom) this will not prevent the effective use of the jack structures. By providing an arrangement in which the forward jack (at least preferably the forward jack) is prevented from movement out of vertical positions by reason of the nature of its extensible connection with the abutment jack and by connecting the forward and rearward floor and roof engaging structures with each other as later described, a very effective arrangement, proof against any possible collapse under the roof pressure, but yet capable of some yielding in the event that the burden of the roof is excessive at a substantial distance from the face, will be made available.

We may now note the structure in more detail. Since, except in the matter of length, the structure of all of the devices for transmitting pressure to the floor or to the roof is essentially the same, it will suffice to describe a single one of these in detail; and accordingly there will be described the upper right hand (looking toward the face) roof-engaging element which is designated 160. This includes an elongated frame element 161 of rigid construction and consisting of a central vertical flange 162 having top and bottom flanges 163 and 164 which are joined by the semi-circular flange portions 165 at the ends of the vertical flange 162. About the periphery of the elongated frame element 161 there are adapted to travel a considerable number of shoe elements 166, which are connected together by pintles 167, which are surrounded by suitably hardened rollers 168, which roll on the flanges 163, 164, 165. The shoe elements 166 are of squared U-shape in cross section, and they have overlapping ear portions as may be seen at 169, and they have inwardly projecting points 170 adapted to engage the sides of the peripheral flanges 163, 164, 165 and to prevent the lateral movement of the shoes off of the flanges. It will be evident that this construction provides relatively long horizontal surfaces built up of a multiplicity of shoes for engagement, in the particular case described, with the mine roof; and the other similar elements, both roof-engaging and floor-engaging, provide a similarly effective engagement with the surfaces which they contact which permits the transmission of relatively large forces, though not too large forces, per square inch of contact, and yet permits, under longitudinally applied moving forces—furnished by means shortly to be described—there being effected bodily movement of the floor and roof engaging devices toward the face without having to reduce the pressure which exists in the jack cylinders which will also shortly be described, and which are generally similar to those which have been described as 51 and 52. One thing more might be added at this point, and that is the fact that forward adjustment toward the face will be possible the more readily with this apparatus because the roof and the floor will tend to become closer to each other progressively as the distance from the face is increased. Theoretically, at least, it is possible that the cylinder and piston mechanisms may actually have to be used to hold back advance, the abutment jack being fixed in position and the fluid entrapped within the cylinder and piston mechanism extending from said jack to the forward jack being placed under pressure by the action of the pressures of the roof (or roof and floor) on the members which engage them.

Referring to Fig. 13, another feature may be noted which is common to the various floor and roof engaging elements. It will be noted that at opposite sides of the flange 162 there are mounted plates 171 and 172 each formed with a bearing collar 173, and it will be noted that these plates 171 and 172 are bolted to the element 161 as at 174, and that the flange 162 has a bore through it at 175 in alinement with the bores of the bearing collars 173. There is arranged similar structure in the case of all four top or roof engaging structures 160, and likewise in the case of the four mine bottom engaging structures 176. Between the pairs of roof engaging structures there are extended cross frames 177 and 178, each of these having bearing pins 179 received in the bearing sleeves 173 carried by the roof engaging elements 160 with which they are associated. Each of the frames 177 and 178 is provided with a box-like center portion 179' having a depending projection 180 curved like a portion of the surface of a ball or sphere and seating in a correspondingly shaped socket or recess 181 formed in a top member 182 carried by the piston structure 183 of the roof jacks which are respectively involved. To distinguish these jacks for further discussion, the forward roof jack, whose piston structure 183 supports the cross arm 177, will be designated 184, and the rear roof jack will be designated 185. Each of these roof jacks includes also, in addition to its piston structure, other structure very similar to the corresponding elements which have been previously described with respect to the earlier form of the invention shown in lower numbered figures. There is also a cylinder member 186, in the case of the forward jack, and 187, in the case of the rearward jack. These cylinder members are mounted in cup-shaped portions 188 of cross frames 189 and 190 which carry pivot pins 191 and 192 respectively, by which they are pivotally connected to the floor engaging structures 176. Thus each floor structure is capable of some adjustment about horizontal transverse axes but not about longitudinally extending axes as is possible with the roof engaging structures 160. Since the rearward floor and roof engaging element should be permitted to undergo adjustments relative to the forward ones with which they make up pairs, but since the rearward elements have no means for advancing them except as they may be furnished with traction by the forward elements, suitable connections for effecting such traction without interfering with independent adjustments will be provided. These may assume various forms, but perhaps the easiest method is simply to provide chains 193 to connect the cross members by which the various floor and roof engaging elements are individually supported. For example, the transverse members 177 and 178 may be connected by pairs of chains 193, one chain at each side of the intermediate abutment providing a jack structure later described and, similarly, pairs of chains may connect the cross arms which rest at their opposite ends in the frames of the floor engaging structures, the latter chains being numbered 194.

Devices similar to the devices 169 and 176 are connected pivotally at 197 to the rear ends of the rearward roof engaging elements 160 and have heavy wheels 198 journaled on axles 199 at their lower rearward ends, and are adapted, in the event that tthe roof starts to collapse, to sustain the weight of the roof and to derive from the weight of the roof a thrust towards the face so that the roof will not pinch the apparatus in such a manner as to prevent its forward movement.

The jack devices 184 and 185 require no further description in view of their general similarity to the structures previously explained with respect to the earlier form of apparatus described. The adjacent ends of each pair of floor and roof engaging members will be provided with bumpers 200, as shown in Figs. 13 and 14, to prevent interference of the treads with each other in the event that, due to changing angular relations of the roof and floor to each other, there be a tendency of one element to override the other. These bumpers will also serve to transmit the moving forces to the rearward jack device 185 and the parts with which it is associated in the event that backing away from the face becomes desirable as will be frequently the case after the ends of shut-down periods, during which periods in some cases the entire roof supporting device will be moved just as close as possible to the face. It will also be possible to unhook the chains 193 and 194, and move up only the forward jack during a shut-down period.

The means for effecting movement of the roof jacks of this embodiment of the invention includes an expansible and collapsible hydraulic abutment jack device 201 which comprises a roof engaging pad 202 carried at the end of a piston structure 203, which is received in a cylinder structure 204 into which fluid pressure can be supplied to effect a firm engagement of a base pad 205 with the mine bottom and the roof pad 202 with the mine roof. This abutment jack has rigidly connected to it the piston mechanism of a hydraulically extensible and contractible cylinder and piston mechanism 207 whose potential feeding range is desirably such as to permit the effecting of an advance movement equal to the thickness of the slice of coal which is to be removed. The cylinder and piston mechanism 207 includes a piston rod 208 carrying a piston 209 which is received in the bore 210 of a cylinder 211 rigidly connected as at 212 with the member 189. Suitable means is provided for delivering fluid to the jack structure 201, to the jack 184, and to the jack 185, and also to the cylinder and piston mechanism 207; and a suitable valve arrangement for this purpose is shown in Fig. 16 and will later be described.

It will be observed, in view of the rigid connection of the piston rod 208 with the base of the abutment jack device 201 and the rigid connection of the cylinder 211 of the cylinder and piston mechanism with the jack 184, that the extension of the jack 201 into firm contact with the mine roof and mine bottom will not only prevent the tipping of this jack but will also prevent the tipping of the jack 184 irrespective of any change in angular relation of the roof and floor engaging devices 160 and 176 to the jack 184. The provision of the abutments 200 and of the chains 193 and 194 prevents the assumption by the rearward pair of roof engaging devices 160 and floor engaging devices 176 of any positions in which the jack 185 may be able to collapse by a swinging movement. In summary, so long as the jack 201 remains erect, there can be no collapsing of the jack mechanisms 184 or 185 except through opening of relief valves associated with them, or through the deliberate venting of fluid from them.

It will be evident, referring to the relative position of the parts shown in Fig. 14, that if the jack 201 be caused to exert pressure between the floor and the roof and if fluid be supplied to the bore 210 of the cylinder 211 of the cylinder and piston mechanism 207 to the left of the piston 209, the entire series of floor and roof engaging jacks will be moved toward the left in Fig. 14, that is, toward the face, and this movement, except in the event that the roof pressure has become literally terrific—more than enough to cause the automatic venting of fluid from the jacks as hereinafter described—will be possible without any necessity for reduction in the pressure exerted by the jack mechanisms 184 and 185 against the roof and floor. Also, by venting fluid from the abutment jack 201 while fluid remains under pressure in the jack 184, the jack 201 may be moved, in preparation for a new feeding movement of the roof supporting jacks, by supplying fluid in an appropriate manner to the cylinder and piston mechanism 207.

It is to be noted that the support jacks 184, 185 and the abutment jack 201 are arranged in the central longitudinal vertical plane between the pairs of floor and roof engaging devices.

With reference to the fluid control structure associated with the arrangements of Figs. 13 and 14, it may be observed that the only difference between this construction and that which was shown in Fig. 10 and following fiugres, consists in the provision of three valves for controlling the supply of fluid to three jacks, to wit, 184, 185 and 201. Thus, there are three housings 215, 216 and 217, each containing a controlling valve, these latter being respectively numbered 219, 220 and 221, and each being of the same character as the controlling valves of Fig. 10 and each having similar operating mechanism. Each of the housings contains a chamber in which its valve is movable, and each chamber communicates through a port with the passage 101''' which corresponds to the passage 101'' of Fig. 10. The valve 219 controls the admission of fluid to the jack 184. The valve 221 controls the admission of fluid to the jack 185, and the valve 220 controls the admission of fluid to the abutment jack 201. As all of the remaining structure, except in mere matters of proportion, is essentially the same as is shown in Fig. 10 and has been fully described, it is unnecessary to go into further detail other than to state that through conduit means not shown the chamber within the boss 215 communicates with the space below the piston of the jack mechanism 184, the chamber within the boss 216 communicates with the space below the piston in the cylinder 204, and the chamber within the boss 217 communicates with the space below the piston in the cylinder 187.

In view of what has heretofore been said, no substantial further description of this embodiment of the invention can be called for. Manipulation of the lever 115' determines which end of the cylinder and piston mechanism 207 has fluid supplied to it and which end is vented, and all that is required to render this device effective to perform its designed function is to time the admission to the several jacks and to the cylinder and piston mechanism 207 in a manner which is completely obvious from what has been previously said. This structure does, however, differ from the embodiment of the invention which has been previously described and also from another which will shortly be described in that the roof may continue to be supported under all ordinary circumstances during the forward movement of the pairs of roof and floor engaging support devices.

Figs. 17, 18 and 19 show a further form of walking jack and roof supporting apparatus which my invention may assume in practice.

In this form of the invention, forward and rearward, hydraulically extensible jacks 251 and 252 are provided. The forward jack 251 has a mine bottom engaging base 253 and the rearward one has a similar base 254. Each of the jacks at its top has a ball supported, roof engaging element 255, having a central socket 256 presenting something more than a hemispherical internal surface 257 which engages and is supported on a ball like head 258 formed or carried on the upper end of a piston rod element 259 which carries a piston 260 slidably received in a bore 261 of a cylinder member 262 supported on the base with which it is associated. The cylinder members 262 have projecting upper ears 263 and 263', and lower ears 264 and 264' are secured to the lower ends of the cylinder members and to the associated bases 253 and 254 respectively. Upper and lower piston and cylinder mechanisms 265 and 266 are provided, each comprising a cylinder member 267 and a piston member 268 having a piston rod 269. The cylinder members of the mechanisms 265 and 266 are pivotally connected to the ears 263 and 264, and the corresponding piston rods are pivotally connected to the ears 263' and 264'. A distributing or control valve box 270 is mounted on the jack 251, for example, on the side of the cylinder 262 of that jack, and fluid supply and return lines 271 and 272 lead to the lower and upper sides of the box 270. These lines come from a valve box 275 having through passages 276 and 277 which may be placed in communication with each other through a cross passage 278, controllable by a valve 279 having an operating handle 280, when it is desired to avoid back pressure on the pump. Conduits 281 and 282 are respectively hydraulic fluid supply and return conduits, and lead from a source of fluid under presure, such as a pump, and to a fluid reservoir or the like, from which the pump takes fluid, the pump and reservoir being not illustrated, as they may be very similar to the corresponding elements shown in Fig. 2, or assume many other forms.

The box 270 has a longitudinal passage 283 extending, as shown, nearly from end to end thereof, and with which the conduit 272 communicates. It also has a connection 284 about midway between its ends to which the conduit 271 leads. It also has three (parallel, as shown) valve receiving bores 285, 286 and 287. These communicate serially with each other at their ends through ports 288, 288' and 289, 289'; and ports 290, 290' connect the ends of the bore 285 with the ends of the passage 283. Two-spool valves 291, 292 and 293 are arranged in the bores 285, 286 and 287 respectively; and these have central grooves 295 and are normally centered as by oppositely acting springs 297, 298, and may be moved in opposite directions by hand operable stems 299, 300 and 301 respectively. Ports 302 and 303 lead from the chamber 285 and are connected by conduits 304 and 305 to the spaces beneath the pistons of the front and rear jacks 251 and 252 respectively. Each of the conduits 304 and 305 has a stop valve 306 in it which is closable to trap fluid in the jacks. Similarly located ports 307 and 308 lead from the bore 286 and are connected by conduits 309 and 310 respectively to the left and right hand ends of the cylinder and piston mechanism 265. In like manner, similarly located ports 311 and 312 extend from the bore 287 and are connected by conduits 313 and 314 respectively to the forward and rearward ends of the cylinder and piston mechanism 266. The conduits are shown schematically, and it will be understood that they will be duly protected. Their connections are conventionally shown, but it will be understood that "Hansen" or other quick detachable connectors may be employed if desired. A port 315, shown as in alinement with the port 284, connects the bores 286 and 287 freely in communication adjacent their central portions, and in like manner the bores 286 and 285 are connected by a port 316 shown in alinement with the ports 284 and 315. It will be readily apparent that when any of the valve elements 291, 292 or 293 is pushed or pulled from its central position sufficiently, fluid will be supplied through the connections described to some point of delivery, and released from some point from which discharge is desired. For example, when the valve 291 is pulled a substantial distance to the right in Fig. 18, fluid will be supplied to the cylinder bore 261 of the jack 252, while if the valve 291 is pushed in the opposite direction the requisite distance, fluid will be supplied to the left hand jack 251; and when fluid is being supplied to either jack, it will be vented from the other. The valve 292 controls the supply of hydraulic pressure fluid to the opposite ends of the cylinder and piston mechanism 265. The valve member 293 is adapted to supply pressure to the cylinder and piston mechanism 266. In order that the pressure admitted to one of the jack devices 251 and 252 shall not be released on shifting the position of the valve device 291 to supply fluid to the other, the stop valves 305, 306 are provided. Stop valves are also provided at 319 and 320 in the conduits 271 and 272. The mode of operation of the structure described in connection with this modification needs not further be described, as it is both self-evident from what has been said, and clearly to be understood from its analogies to other forms.

Fig. 17 shows a conveyor mechanism adapted to be associated with and advanced by the jack structure of that figure. It will be observed that the base 253 at its forward edge is adapted to engage and to "bulldoze" forwardly the underlying support structure for a conveyor generally designated 325. This conveyor includes trough section units each including a bottom plate 326 and an upturned outer edge 327, and angle skid members 328 underlie the bottom plates, and keep them raised slightly above the mine bottom, and promote their sliding transversely to their lengths. The unit lengths of the trough sections is such that they extend between successive roof jack structures, and opposite the forward edge of each roof jack structure there is a pivot 330 arranged between adjacent units 325A and 325B, as shown in Fig. 23. The adjacent ends of the units are cut away obliquely as at 331 and 332 at opposite sides of the pivot to allow the trough units to angle with respect to each other, so that, as the face is advanced, the trough units may be moved forwardly practically as rapidly as the advance of the face takes place. Angle plates 333 are secured to the bottom of one trough unit and underlie the adjacent end of the next trough unit, so as to prevent spillage between the trough units. The conveyor chain is of a type which has its flights folded up during their return movement, and they then pass within a housing portion 335 on the return run; and the chain proper includes upper link members 336, lower link members 337 which carry the flight driving members 338 integrally formed therewith, and intermediate connecting link members 339. The flights proper 340 are pivotally mounted at 341 on the members 338 and normally run over the flat portions of the trough sections previously described. Opposite runs of the conveyor driving chain extend at opposite sides of channel members 342 and 343 which are connected to the plates 326, and in order to permit elongation of the units between the various pivot joints or connections 330, the trough units are each made in two sections, and a slide element 344 is welded or otherwise suitably secured between the channels 342 and 343 on one section of each trough unit, and the free end of the member 344 is slidably received between the channels on the other section of such unit. It will be appreciated that when the jack adjacent one of the pivots 330 moves forwardly while the jack adjacent the next pivot does not move forwardly, some elongation of the underlying trough structure is necessary, and such an elongation is made possible by the sliding connection mentioned; and it will be evident that when the next jack is advanced and the sections of the previously angled trough unit again come into line, the lost motion will be taken up. The conveyor chain is of such length that without an abnormal amount of slack in it, the few inches of give, so-to-speak, that are necessary in order to permit the chain to accommodate itself to the changes in length of the trough that occur when there is a change from the condition with all of the units in line to a condition similar to that shown in Fig. 1, need have no special provision made for it. Returning to the pivots 330, it will be observed that bars 345 having overlapping portions 346 are secured between the channels 342 and 343 and a pivot pin 347 extends through openings 348 in such overlapping portions 346 and is welded to one of the adjacent bottom plates 326, but not to the other.

Figs. 25 and 26 show a modification of the structure of Figs. 13 to 16, Fig. 26 showing the controlling valve mechanism and Fig. 25 a somewhat different arrangement of the jack mechanisms. Because of the similarity in construction, the forward jack mechanism may be identified as 184' and the abutment jack mechanism as 201' and the rearward jack mechanism as 185'. The abutment jack mechanism 201' and the jack mechanism 184' and the cylinder and piston mechanism 207' connecting them are essentially identical with the corresponding parts in the embodiment of the invention shown in Figs. 13, 14 and 15. The chains 193 and 194 are not used, however, to connect the rearward jack mechanism 185' through its roof and floor engaging devices 160' and 176' with the arm mechanisms 177' of the jack 184'. Instead, a cylinder and piston mechanism 355 is provided. This consists of a cylinder 356 having a forward head 357 pivotally connected as at 358 to a rearwardly projecting portion 359 of the cylinder member 204'. Within the bore of the cylinder and piston mechanism 355 is a suitably packed piston 360 having a piston rod 361 of rugged construction and rigidly connected at 362 to the member 188' of the jack device 185'. Suitable connections 365 and 366 are provided for the delivery of fluid to and the venting of fluid from the opposite ends of the cylinder 356, and a connection 367 is provided for the supply of fluid to and its release from the jack device 185', such connection corresponding to the bottom connection for the jack 185 of Figs. 14 and 15. It will be understood that by increasing the length of the rearward members 160' and 176' and locating the pistons 360 in the rearward ends of their cylinders when the members 160' and 160' (and the members 176' and 176') are close together, another mode of walking could be provided, in that the front and rear jacks could then both be advanced while the abutment jack is stationary, instead of advancing the front jack, advancing the abutment jack, and then advancing the rear jack.

It will be observed that tipping of the jack device 184' is impossible because its cylinder and the cylinder of the abutment jack 201' are prevented from moving out of parallelism. Collapse, through tilting movement, of the jack device 185' is prevented by reason of its connection through the cylinder and piston mechanism 355 to the base of the jack 201'. It will be evident that if, through pressure to which the mine floor is subjected, there should be a tendency for the floor to be forced upwardly slightly in its portion beneath the jack device 185', this will be possible, without disturbing anything, because of the pivotal connection between the jack 185' and the abutment jack 201', for such connection permits the jack 185' to be moved out of a position substantially perpendicular to the mine bottom. This structure therefore possesses certain advantages in simplicity over the construction of Figs. 13, 14 and 15.

The valve mechanism of Figure 26 does not need detailed description. Manually controlled valve mechanisms 371, 372 and 373, with in-built relief valves, are provided for controlling the admission of fluid to the jack device 184', the abutment jack device 201', and the jack device 185'. These control the communication of the jacks which they respectively control with a fluid supply connection 101''''. In addition to the valve device for controlling the supply of fluid to the cylinder and piston mechanism 207, which valve device corresponds to the control for the cylinder and piston mechanism 207 shown in Fig. 16, and which therefore will not need further description, there is provided another valve device 375 of the two-spool type for controlling communication of the connections or conduits 365 and 366 with a passage 376 supplied with hydraulic fluid under pressure, and with exhaust passages 377, 377, the conduits 365 and 366 communicating with ports 378 and 379 opening through the wall of a chamber 380 in which the valve device 375 is reciprocable by a suitable manual control lever mechanism 381. The present modified form of the invention and its mode of operation and control will require no further description in view of the general similarities to structures of Figs. 13 to 16.

At this point, it may be mentioned that conveyors are not shown in connection with the species of the invention of Figs. 13 to 16, and the modification of that species shown in Figs. 25 and 26. These devices, however, may have, for example, conveyors of the character shown in Figs. 17, 20, 21, 22, 23 and 24 employed with them; and buffers similar to the buffers 200 may be provided at the forward ends of the forward floor engaging devices 176' for engaging the bases of these conveyors and bulldozing them forward when the jacks 184' are moved towards the face.

Figs. 27 to 32 are included to clarify the various problems met in roof control and to illustrate the adaptability of my invention.

Fig. 27 is included to show the location of the break line were no jacking devices to be used. Under such conditions the break in the overlying strata takes place at the coal line 401, and the roof 402 subsides until it is supported on the mass of material formed by the disintegration of the roof.

With the use of cribs 403 and posts or props 404 as shown in Fig. 28, the break line 405 can be kept back from the face, but the posts or props may be, and frequently are, ineffective to prevent subsidence in such proximity to the coal line as to necessitate considerable expense in restoring normal mining operations, and complete safety cannot be provided.

In Fig. 29, there is illustrated a condition in which, within the permissible pressure within the jacks, the roof may be maintained without subsidence within the full length of the roof engaging rails, when such rails are in relative positions of comparatively small overlap. The rear, inclined rails or fenders have a disintegrated mass of roof material engaging them, and the break line 406 is at the outer end of the rearward rails which support the roof. The mine bottom has been raised slightly outwardly of the base of the outer jack, but the two roof jacks are perpendicular to the roof and the roof supporting rails are perpendicular to the jacks.

Fig. 30 shows a situation in which the roof is subsiding from a point 407 adjacent the area of overlap of the roof supporting rails, and the bottom is being forced up from a point 408 forward of the pedestal of the rear jack. The break line is at the outer end of the now sloping rearward rails pivotally supported at the top of the rear jack, the roof forwardly of the break line 409 being downwardly sloping, but having, with the support the jacks provide, not broken. The position of the rearward jack is such as it would assume after the roof pressure had been excessive, with resultant release of some fluid from the jack, and with a relaxation of the excessive roof pressure as there was partial subsidence. Note the forward slope of the rearward jack, but the fact that the side channels prevent all danger of collapse by forward tilting.

In Fig. 31, the mine bottom has remained level, with roof subsidence similar to that of Fig. 30. Here the outer jack is still vertical, as contrasted with the forward slope of the rearward jack in Fig. 30.

In Fig. 32 approximately the same roof and floor conditions as exist in Fig. 30 are represented, but the rails and pedestals are replaced by the structures of Figs. 13, 14 and 15, and the roof and floor have their convergence controlled, but adjustments of the jack devices towards the face may be made even under the heavy pressures existing, without its being necessary to relieve the pressure within either of the roof jacks, the presence of the abutment jack providing the necessary point of reaction for the feed cylinder and piston mechanism, and the mass of material acting on the improved fenders to the rear of the break line 410 aiding in the process of forward feeding.

From the several forms of my invention illustrated, it will be evident that I have made marked improvements in the art of roof control and in the apparatus therefor. Because the advantages of the invention are so fully set forth in the disclosure of its several forms, an extended recapitulation at this point is unnecessary, and I would simply point out that, while there are in this application specifically described several embodiments which my invention may assume in practice, it will be understood that these are shown for purposes of illustration and that the invention may be further modified and embodied in various other forms without departing from its spirit or the scope of the appended claims.

What I claim as new and desire to secure by Letters Patent is:

1. In an apparatus of the character described, in combination, a pair of upright jacks disposed one in front of the other and each having mine floor and mine roof engaging devices, means for extending said jacks and forcing the roof engaging devices thereof against the roof, cylinder and piston means interposed between said jacks, with the axis thereof in a line intersecting the axes of said jacks, for advancing said jacks in alternation, and guiding means pivotally fixed to one of said jacks and guidingly engaging the other during their relative advancing movements for maintaining their relative movement in lines parallel to the axis of said cylinder and piston means.

2. A roof supporting jack mechanism including horizontally spaced upright jack cylinder and piston mechanisms each supporting a roof support and having a mine bottom engaging base, feed cylinder and piston mechanisms disposed and extending between said jack mechanisms for effecting walking thereof, a telescopic shield for said feed cylinder and piston mechanisms, guide elements connected to one of said jack cylinder and piston mechanisms and slidably cooperating with the other thereof, and a pump constituting a source of fluid for said cylinder and piston mechanisms and mounted above one element of said telescopic shield upon said guide elements.

3. In a walking jack mechanism, a base, a roof support having forward and rearward ends, a jack on said base for adjusting said roof support, means in advance of said jack for advancing it relative to a working face, and a fender pivotally connected to the rearward end of said roof support and extending obliquely rearwardly therefrom into engagement with a mine bottom.

4. A mine roof supporting jack mechanism, comprising mine roof and floor engaging members, an extensible jack device between said members for supporting the roof engaging member, and a supporting member connected to said roof engaging member and extending diagonally in a rearward direction between the roof and floor for supporting the subsiding roof rearwardly of said jack device.

5. A mine room supporting jack mechanism, comprising mine roof and floor engaging members, an extensible jack device arranged in an upright position between said members for supporting the roof engaging member in roof supporting position, an extensible jack device arranged forwardly of said upright jack device for moving said upright jack device horizontally in a forward direction while in supporting relation with the mine roof, and a supporting member connected to said roof engaging member and extending diagonally in a rearward direction between the roof and floor and resting at its lower end on the floor for supporting the subsiding roof rearwardly of said upright jack device as the latter is moved forwardly.

6. A mine roof supporting jack mechanism, comprising an extensible upright front jack device, an extensible upright rear jack device, said devices having mine roof and floor engaging members, an extensible jack device disposed between and extending horizontally between said upright jack devices for moving said rear jack device horizontally toward said front jack device while in supporting relation with the roof to permit subsidence of the roof, and ramp means extending rearwardly of said rear jack device and connected to move therewith, said ramp means extending diagonally between the roof and floor and resting on the latter and serving to support the subsiding roof as said rear jack device is moved forwardly.

7. In a mine roof supporting jack mechanism, mine roof and floor engaging means having mobile contact with the floor and roof, an extensible upright jack device arranged between said roof and floor engaging means for supporting said mine roof-engaging means, an extensible jack device for moving said upright jack device horizontally in a forward direction while in supporting relation with the roof thereby to cause said floor and roof engaging means to travel horizontally along the roof and floor, and a rearwardly and downwardly inclined support connected to said roof engaging means and having rolling contact with the mine floor for supporting the subsiding roof as said upright jack device is moved forwardly.

8. A mine roof supporting jack mechanism, comprising an upright roof supporting jack device comprising mine roof and floor engaging members and an extensible jack between said members for supporting the roof-engaging member, power operated means connected to said jack device for moving the latter horizontally while said jack device is in supporting relation with the roof, and a supporting device connected to the roof-engaging member of said jack device to move horizontally therewith and extending diagonally in a rearward direction between the roof and floor for supporting the subsiding roof as said jack device is moved horizontally, said supporting device including an inclined support having a guideway and an endless link chain providing a wide roof supporting surface and guided for free circulation in an orbital path along said guideway, said endless chain circulating freely relative to said inclined support as the latter is moved horizontally with said jack device as aforesaid.

References Cited in the file of this patent

UNITED STATES PATENTS

| Re. 18,491 | Taber | June 14, 1932 |
| 1,032,849 | Moore | July 16, 1912 |
| 1,065,544 | Mayes | June 24, 1913 |
| 1,450,329 | Morgan | Apr. 3, 1923 |
| 1,450,603 | Morgan | Apr. 3, 1923 |
| 1,486,293 | Morgan | Mar. 11, 1924 |
| 1,525,447 | Hose | Feb. 10, 1925 |
| 1,588,987 | O'Toole | June 15, 1926 |
| 1,637,531 | Morgan | Aug. 2, 1927 |
| 1,704,866 | Morgan | Mar. 12, 1929 |
| 1,821,439 | Levin | Sept. 1, 1931 |
| 1,821,440 | Levin | Sept. 1, 1931 |
| 1,920,500 | Garcia | Aug. 1, 1933 |
| 1,927,078 | Weeks | Sept. 19, 1933 |
| 1,965,043 | McDermott | July 3, 1934 |
| 1,999,931 | Hughes | Apr. 30, 1935 |
| 2,105,504 | Ramsay | Jan. 18, 1938 |
| 2,205,013 | Joy | June 18, 1940 |
| 2,272,013 | Kida | Feb. 3, 1942 |
| 2,366,121 | Martin-Hurst | Dec. 26, 1944 |
| 2,420,755 | Mavor | May 20, 1947 |
| 2,461,810 | Curtis | Feb. 15, 1949 |
| 2,496,694 | Brown | Feb. 7, 1950 |

FOREIGN PATENTS

| 457,122 | Great Britain | Nov. 23, 1936 |